March 9, 1948. W. W. WILLIAMS 2,437,577
ABSORPTION REFRIGERATION SYSTEM INCLUDING
CONDENSER PRESSURE CONTROL MEANS
Original Filed Aug. 3, 1940 2 Sheets-Sheet 1
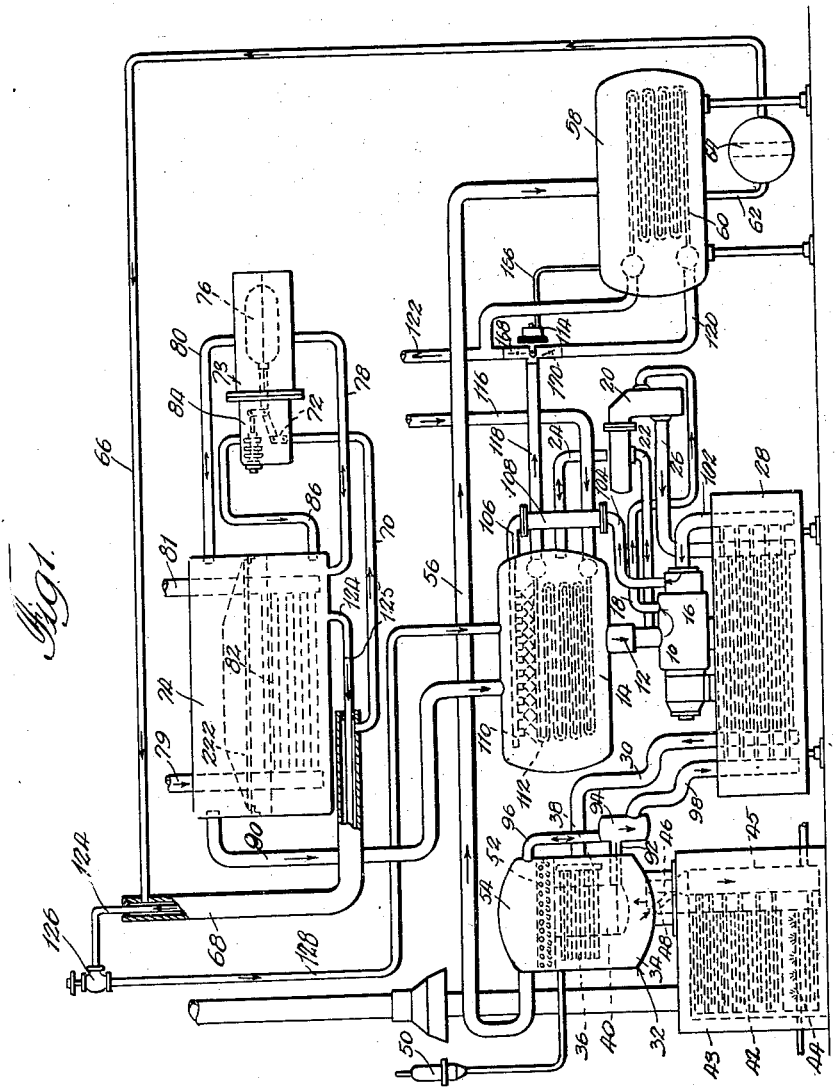
Inventor:
Walter W. Williams.
By: Thiess, Olson & Mecklenburger
Attys.

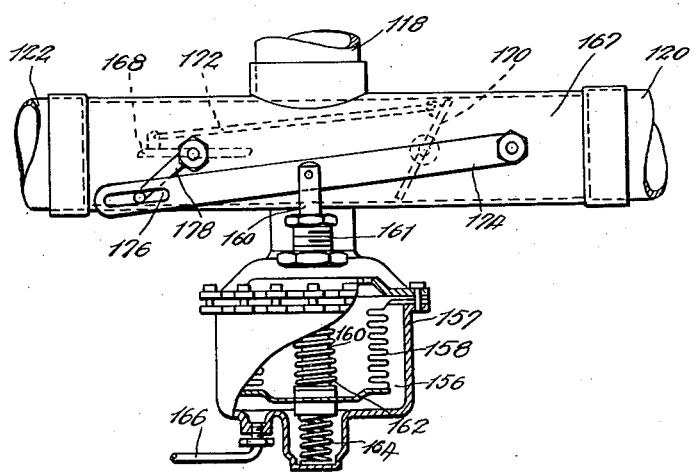

Patented Mar. 9, 1948

2,437,577

UNITED STATES PATENT OFFICE 2,437,577

ABSORPTION REFRIGERATION SYSTEM INCLUDING CONDENSER PRESSURE CONTROL MEANS

Walter W. Williams, Bloomington, Ill., assignor to Eureka Williams Corporation, a corporation of Michigan Original application August 3, 1940, Serial No. 350,993. Divided and this application March 27, 1944, Serial No. 528,281

7 Claims. (Cl. 62—5)

This application is a division of my prior application Serial No. 350,993, filed August 3, 1940, for Refrigerating apparatus, which matured into Patent No. 2,356,639 on Aug. 22, 1944.

This invention relates to a refrigeration apparatus, and more particularly to a refrigerating apparatus of the absorption type.

More particularly, this invention relates to the provision of a new and improved absorption refrigerating apparatus in which a fluid, such as water or air, may be chilled to produce the desired refrigeration. The apparatus or system herein disclosed is adapted for use primarily in air conditioning systems or refrigerating systems of a domestic or commercial type, and it is an object thereof to provide means for regulating the transfer of solvent and refrigerant in a refrigerating system whereby optimum heat transfer and economy result.

Further and additional objects will appear from the following description, the appended drawings, and the accompanying claims.

An absorption refrigerating apparatus constructed in accordance with one embodiment of this invention comprises an absorber in which the refrigerant vapor, such as methylene chloride, is absorbed by a solvent, such as the dimethyl ether of tetraethylene glycol; a generator or heater in which the refrigerant is distilled from the strong solution; a heat exchanger for effecting the transfer of heat between the hot, weak, solvent solution flowing from the heater to the absorber and the cool, strong solution of refrigerant dissolved in the solvent flowing from the absorber to the heater; a condenser in which the refrigerant vapor from the heater is condensed to a liquid; and a chiller into which the refrigerant liquid is expanded and through which the fluid to be cooled is passed.

In the operation of the above apparatus, the gaseous refrigerant is dissolved in the liquid solvent in the absorber, and the mixture of strong solution is circulated through the heat exchanger to the generator. Within the generator the strong solution is subjected to elevated temperatures, causing the refrigerant to separate from the solvent in the form of a vapor. The refrigerant vapor is passed to a condenser where it is cooled and condensed to a liquid, and the condensed liquid is expanded through an expansion valve and passed to the chilling unit. The expansion valve may be float-controlled so that the amount of liquid refrigerant passing therethrough into the chiller is dependent upon the liquid level of refrigerant within the chiller, and a constant level may thereby be maintained. The refrigerant vapors formed in the chiller are then recirculated from the chiller unit to the absorber wherein they are re-absorbed by the weak solution of solvent which is withdrawn from the heater or generator, returned through the heat exchanger, strained and reintroduced into the absorber.

Means are also provided for returning any small quantities of solvent that may inadvertently collect in the chiller. The rate of flow of strong solution pumped from the absorber may be controlled by a specially constructed float valve which will be hereinafter more fully described. Also the amount of flow of the cooling water through coils in the absorber and the condenser may be regulated by an automatic pressure-controlled valve which operates to automatically maintain the high side pressure in the apparatus at a substantially constant predetermined value regardless of the temperature of the cooling water. The pressure on the high side of the system is about atmospheric or slightly above, and the pressure of the low side is between about 20 to 25 inches of mercury vacuum when methylene chloride and the dimethyl ether of tetraethylene glycol are used as the refrigerant and solvent, respectively.

For a more complete understanding of this invention, reference will now be had to the drawings, in which Figure 1 is a diagrammatic view of a complete refrigerating apparatus constructed in accordance with one embodiment of this invention;

Fig. 2 is a side elevational view, partially in section, of a valve employed in the system shown in Fig. 1 which is used to regulate the amount of cooling water passing through the coils of the condenser.

Referring now more particularly to Fig. 1, it is believed that the refrigerating apparatus there shown can best be understood by tracing the circulation of the various fluids therein.

The strong solution of solvent and refrigerant is removed from the sump 12 of an absorber 14 by a duplex pump 16, driven by any suitable means (not shown). The pump 16 is preferably one of the impositive displacement type, such as a centrifugal pump, wherein the volume of fluid pumped through it may be controlled by the back pressure on the pump. The solution is discharged from the pump through a conduit 18 to a float-control valve 20 having conduits 22 and 24 associated therewith leading to a conduit below the sump 12 and to the absorber 14, respectively, which serve to maintain a level of liquid in the valve the same as the level in the sump 12. The float-controlled valve which is fully described in my prior application, Serial No. 350,993 of which this application is a division, thus regulates the rate of flow of strong solution pumped from the absorber, and is adjusted to prevent the level of fluid in the sump from falling below a predetermined level, whereby cavitation of the pump is prevented.

From the float valve 20 the strong solution passes through a conduit 26, a heat exchanger 28, and a conduit 30 into the manifold 38 of a heater or generator 32. The generator comprises a steam jacket 34 having disposed therein a plurality of coils 36 fed from the manifold 38, each of which coils discharges into an inner receptacle 40 of the heater 32. The steam chamber 34 is supplied with live steam from the steam coils 42 of a boiler 43, which boiler is heated by a gas or oil burner 44. The steam passes from the steam coils 42 into a header 45 and thence through the duct 46 into the steam chamber 34, the condensate returning back to the header 45 through conduit 48. A safety valve 50 is provided for the steam chamber. This generator 32 is more fully described in Patent No. 2,280,210, Glenn F. Zellhoefer, dated April 21, 1942.

The strong solution pumped into the manifold 38 of the heat generator 32 is passed through the coils 36 and discharged into the inner receptacle 40. In this receptacle, maintained at elevated temperatures by the steam jacket 34, the refrigerant separates from the solvent and the refrigerant vapors pass through an eliminator 52 to the upper portion 54 of the generator and thence through a conduit 56 to a condenser 58. The temperature of the condenser 58 is controlled by cooling coils 60 which are supplied with water in a manner to be hereinafter more fully described.

The refrigerant vapors condensed in the condenser 58 pass as a liquid through conduit 62, a dehydrator 64, and conduit 66 to the outer jacket of a heat exchanger 68. From the heat exchanger 68 the liquid passes through conduit 70 to a float-controlled valve 72 positioned in a housing 73.

The float-operated valve 72 serves as an expansion valve for the liquid refrigerant; thus the liquid passing through the valve 72 passes from a high pressure zone in the conduit 70 to a low pressure zone within the valve chamber 84. A portion of the liquid refrigerant vaporizes, resulting in cooling, and the cold vapors and liquid refrigerant mixture passes from the valve chamber 84 through conduit 86 to the chilling chamber 74. The liquid refrigerant passing into the chiller is maintained at a constant level in the chiller 74 by controlled addition of refrigerant thereto as regulated by means of the float-controlled valve 72. The float valve 72 is operated by the float 76 maintained at about the same level as the liquid in the chiller 74 through the equalizing lines 78 and 80.

A medium to be cooled enters chiller 74 through a conduit 79, passing through coils 82 submerged in the liquid refrigerant and out through a conduit 81, for use as desired. The fluid passing through the coils 82 is in heat-exchange relationship with the refrigerant in the chiller 74, and the refrigerant is thereby caused to boil by the exchange of heat from the relatively warm fluid in the coils 82 to the refrigerant. The level of liquid refrigerant in the chiller may be adjusted as desired, but it is preferable to have it extend up above the level of the coils 82 within the chiller through which the fluid to be cooled is circulated. The boiling of the refrigerant vapors from the body of liquid refrigerant causes a chilling of the coils 82, and the vapors escape from the top of the chiller 74 through conduit 90 to the upper portion of the absorber 14, wherein the refrigerant vapors are again contacted with the solvent for re-absorption and recirculation through the heat exchanger 28 and the generator 32, as hereinbefore described.

The weak solvent solution from which the refrigerant has been distilled in the heater or generator 32 drops to the bottom of the inner chamber 40 of the generator and passes out thereof by gravity flow through conduit 92 into a sump 94, the sump being provided with a vent 96 leading to the upper portion 54 of the generator 32. From the bottom of the sump 94 the weak solution passes by gravity flow through conduit 98 to the heat exchanger 28, where the heat of the weak solution is transferred to the strong solution leaving the absorber and entering the heater in counterflow arrangement on the heat exchanger. The preheating of the strong solution prior to the passage thereof into the heater effects an economy in steam consumption in the heater. From the heat exchanger 28, the weak solution is recirculated to the absorber 14 through conduits 102, the other half of the pump 16, conduit 104, strainer 108, and conduit 106. The pump serves to maintain a constant head of solvent in a nozzle bank 110 through which the weak solution is pumped into the absorber 14 onto water-cooled coils 112. The refrigerant vapors are re-absorbed by the weak solvent, and the solvent containing the absorbed refrigerant vapors is then withdrawn from the bottom of the absorber 14 through the sump 12 and recycled as hereinbefore described.

The cooling coils 112 are provided in the absorber 14 for the purpose of dissipating the heat of solution evolved when the gaseous refrigerant is re-absorbed by the solvent. The coils further function to provide a means for distributing the solvent in thin films over the surface of the interior of the absorber so that the refrigerant may be readily absorbed by the solvent.

The condenser 58 is also provided with fluid-cooled coils in order to cool the gaseous refrigerant from the generator to the point of liquefaction at the relatively high pressure in that portion of the system. It is important that the pressure on the high pressure side of the system be maintained sufficiently great to cause optimum flow of the refrigerant through the system, and further to permit the weak liquor to be forced from the bottom of the chamber 40 in the heater 32 back through the heat exchanger 28 and into the absorber 14. In order to effect this control and to maintain the condensate at a temperature so that proper pressure differentials will be maintained, the volume of cooling fluid passing through the coil 60 of the condenser 58 is automatically regulated by valve 114 which in turn is operated by the pressures within the condenser 58. A detail view of the valve is shown in Fig. 2 and will be hereinafter more fully described.

Fluid such as water is passed from a suitable source of supply, such as a water tower, through conduit 116, through the coils 112 of the absorber 14, and through conduit 118 to the two-way valve 114. The valve 114 is pressure operated and so constructed that increased pressure of the refrigerant within the condenser 58, resulting from a warming up of the condenser during normal operation, causes the valve to operate so that an increased amount of cooling fluid will pass from the conduit 118, through conduit 120 and into the cooling coils of the condenser. The cooling effect of the fluid within the coils of the condenser decreases the pressure of the refrigerant therein which has the effect of operating valve 114 through the pressure line 166 in the opposite direction, causing more of the water to by-pass the condenser and escape from the system through conduit 122. By this means the temperature within the condenser is accurately controlled, which, in turn, controls the pressure on the weak solvent solution within the container 40 of the heater 32, thereby insuring its proper return through the heat exchanger 28 to the absorber 14. Constant pressures and temperatures are therefore obtainable in the condenser even through the temperature of the cooling fluid may be varied over a wide range.

The valve 114 is automatically operated by the fluid pressure in the condenser 58, and is shown in detail in Fig. 2 of the drawings to which reference will now be had. The valve construction comprises a pressure chamber 156 within a housing 157, the housing also containing a pressure-operated mechanism including a bellows 158, a plunger 160, a compression spring 162, and a guide spring 164.

The pressure chamber 156 is in direct connection with the vapor chamber of the condenser 58 by means of the pressure conduit 166. Thus, when pressure is applied through the conduit 166, the plunger 160 is pushed upwardly against the compression of spring 162 to extend out of the pressure chamber a greater distance. As shown in Fig. 2, the housing 157 for the pressure chamber 156 is secured to the outside of a conduit 167 within which are pivoted a pair of butterfly valves 168 and 170. As shown, these butterfly valves are reciprocably secured to each other by a rod 172 which extends through holes positioned in projections located on the ends of each of the butterfly valves so that when one is operated, the other one will be also. The length of the rod 172 is so adjusted that the valve 168 is brought into the full open position when the valve 170 is in the full closed position, and vice versa.

The valves 168 and 170 are operated by the plunger 160 by means of a lever 174 pivotally mounted at one end thereof to the outside of the conduit 167. The upper end of the plunger 160, which extends outwardly of a packing gland 161, is pivotally secured to a central portion of the lever 174, the free end of the lever having a slot 176 positioned therein which is adapted to receive the end of a crank bar 178. The crank bar 178 is mounted on the same shaft as, and rotates with, the butterfly valve 168, whereby raising of the crank bar 178 from the position shown in the drawing will close the butterfly valve 168. From the above, it is clear that, when the pressure is increased within the pressure chamber 156, the plunger 160 is raised, which in turn pivots the lever 174 upwardly, causing the butterfly valve 168 to close and the butterfly valve 170 to open. Contrariwise, when the pressure in the pressure chamber 156 drops, the reverse occurs.

As hereinabove explained, it is desirable that an optimum pressure be maintained within the condenser 58 in order to maintain proper pressure differentials in the system and to insure the return of the weak solvent from the inner chamber 40 of the heater 32 back to the absorber 14. In order that this pressure may be regulated, the temperature is controlled in the condenser by the rate at which the cooling fluid is passed therethrough. The two-way valve 114 may be adjusted so that when the pressure becomes greater than the desired optimum, the valve 170 opens and valve 168 closes, whereby a portion of the cooling water is passed through the conduit 120 to the condenser coils 60, automatically cutting down the amount of cooling fluid by-passing the condenser through the conduit 122. If the condenser gets too cold, the pressure in the chamber 156 will be reduced and the amount of fluid by-passing the condenser will be increased.

It will be clear from the above description of the arrangement and operation of the valve 114 that the temperature and pressures within the condenser will always be held at a constant value, regardless of the fluctuations in the temperature of the cooling fluid entering from the absorber through the conduit 118. If the fluid is relatively cold, only small amounts will be passed through the condenser, while if it is comparatively warm, larger amounts will be passed therethrough and only smaller amounts will be by-passed.

The chiller unit 74 and the float valve for controlling the flow of refrigerant from the condenser 58 are described in detail in my above referred to prior application, Serial No. 350,993, and no further description of these portions of the apparatus is thought to be necessary in this application.

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

I claim:

1. In an absorption type refrigerating apparatus, the combination of a condenser, cooling coils for the condenser, means for passing a cooling fluid through said coils, a valve associated with said last-mentioned means for regulating the flow of said fluid into said coils, and a pressure-responsive mechanism for operating said valve in accordance with the vapor pressure within said condenser whereby the temperature and pressure of the refrigerant in said condenser is regulated to a predetermined value.

2. In an absorption type refrigerating apparatus of the character described, the combination of a heater, a condenser, cooling coils for the condenser, means for passing a cooling fluid through said coils, a valve associated with said last-mentioned means for regulating the flow of said fluid into said coils, and a pressure-responsive mechanism for operating said valve in accordance with the vapor pressure within said condenser whereby the temperature of the refrigerant in said condenser is regulated to a predetermined value and whereby the pressure of refrigerant vapors within said heater is maintained substantially constant.

3. In an absorption type refrigerating apparatus of the character described, the combination of a heater, a condenser, cooling coils for the condenser, conduits for directing a cooling fluid to and from said coils, a by-pass valve associated with said conduits for regulating the flow of said fluid to said coils, and a pressure-responsive mechanism for operating said by-pass valve in accordance with the vapor pressure within said condenser whereby the temperature of the refrigerant in said condenser is regulated to a predetermined value and whereby the pressure of refrigerant vapors within said heater is maintained substantially constant.

4. In an absorption type refrigerating apparatus of the character described, the combination of an absorber, cooling coils in the absorber, a heater, a condenser, cooling coils in the condenser, means for passing a cooling fluid into said absorber coils, means including a by-pass valve for passing the fluid from said absorber coils to said condenser coils, and means for discharging said fluid from the condenser coils, said by-pass valve including a pressure-responsive mechanism for operating said valve in accordance with the vapor pressure within said condenser whereby a portion of said cooling fluid passes through said valve to control the temperature within said condenser to a predetermined value whereby a predetermined constant pressure of refrigerant vapor is maintained in said condenser and said heater.

5. In an absorption type refrigerating apparatus of the character described, the combination of a heater, a condenser, cooling coils for the condenser, conduits for directing a cooling fluid to and from said coils for controlling the temperature in said condenser, and a flow regulating means for controlling the amount of flow of cooling fluid through said cooling coils, said flow regulator means comprising a valve in the conduit for directing cooling fluid into the cooling coils, a by-pass valve, common actuating means for alternately opening and closing said valves, and a pressure-responsive mechanism for operating said actuating means in accordance with the pressure within said condenser.

6. In an absorption type refrigerating apparatus of the character described, the combination of a heater, a condenser, cooling coils for the condenser, conduits for directing a cooling fluid to and from said coils, a chamber having an inflow orifice and a pair of outflow orifices associated with said conduits, a pair of valves in said chamber positioned between said inflow orifice and each of said outflow orifices to control the flow of cooling fluid through the chamber from the inflow orifice to said outflow orifices, and pressure-responsive means responsive to the vapor pressure within said condenser for operating said valves to effect the opening of one and the simultaneous closing of the other, whereby the temperature of the refrigerant in said condenser is regulated to a predetermined value and the pressure of refrigerant vapors within said heater is maintained substantially constant.

7. In an absorption type refrigerating apparatus of the character described, the combination of an absorber, cooling coils in the absorber, a heater, a condenser, cooling coils in the condenser, means for passing a cooling fluid into said absorber coils, means including a by-pass valve for passing the fluid from said absorber coils to said condenser coils, and means for discharging said fluid from the condenser coils, said by-pass valve including a chamber having an inflow orifice and a pair of outflow orifices, a pair of valve members positioned between said inflow orifice and each of said outflow orifices, and means for operating said valve in response to the vapor pressure within said condenser to open one valve member and simultaneously close the other whereby a portion of said cooling fluid passes through said valve to said condenser to control the temperature thereof and a predetermined constant pressure of refrigerant vapor is maintained in said condenser and said heater.

WALTER W. WILLIAMS.

REFERENCES CITED

The following references are of record in the file of this patent:

UNITED STATES PATENTS

| Number | Name | Date |
|---|---|---|
| 1,937,565 | Griffiths | Dec. 5, 1933 |
| 1,992,048 | Temple | Feb. 18, 1935 |
| 2,042,694 | Zellhoefer | June 2, 1936 |
| 2,298,924 | Bichowsky | Oct. 13, 1942 |
| 2,365,797 | Bichowsky | Dec. 26, 1944 |
| 2,378,177 | Bichowsky | June 12, 1945 |